3 Sheets—Sheet 1.

J. H. IRWIN.

Assignor of one-half interest to C. B. SAWYER and J. S. DENNIS.

Lantern.

No. 8,611. Reissued Mar. 4, 1879.

Witnesses
W. C. Corlies
Jno. C. MacGregor.

INVENTOR
John H. Irwin.
By C. Burnett Thacher
Attorneys

J. H. IRWIN.

Assignor of one-half interest to C. B. SAWYER and J. S. DENNIS.

Lantern.

No. 8,611. Reissued Mar. 4, 1879.

Witnesses
W. C. Corlies
Jno. C. MacGregor

INVENTOR
John H. Irwin.
By Johnson & Thacher
Attorneys

J. H. IRWIN.

Assignor of one-half interest to C. B. SAWYER and J. S. DENNIS.

Lantern.

No. 8,611. Reissued Mar. 4, 1879.

Witnesses
W. B. Corlies
Jno. C. MacGregor.

INVENTOR
John H. Irwin.
By Osburn & Thacher
Attorneys

UNITED STATES PATENT OFFICE.

JOHN H. IRWIN, OF PHILADELPHIA, PENNSYLVANIA, ASSIGNOR OF ONE-HALF INTEREST TO CHARLES B. SAWYER AND JOSEPH S. DENNIS.

IMPROVEMENT IN LANTERNS.

Specification forming part of Letters Patent No. 73,012, dated January 7, 1868; Reissue No. 8,611, dated March 4, 1879; application filed January 15, 1879.

*To all whom it may concern:*

Be it known that I, JOHN H. IRWIN, of Philadelphia, county of Philadelphia, and State of Pennsylvania, formerly of Chicago, county of Cook, and State of Illinois, have invented a new and useful Improvement in Lanterns and Street-Lamps, which is fully described in the accompanying specification, reference being had to the accompanying drawings, in which—

Figure 1:
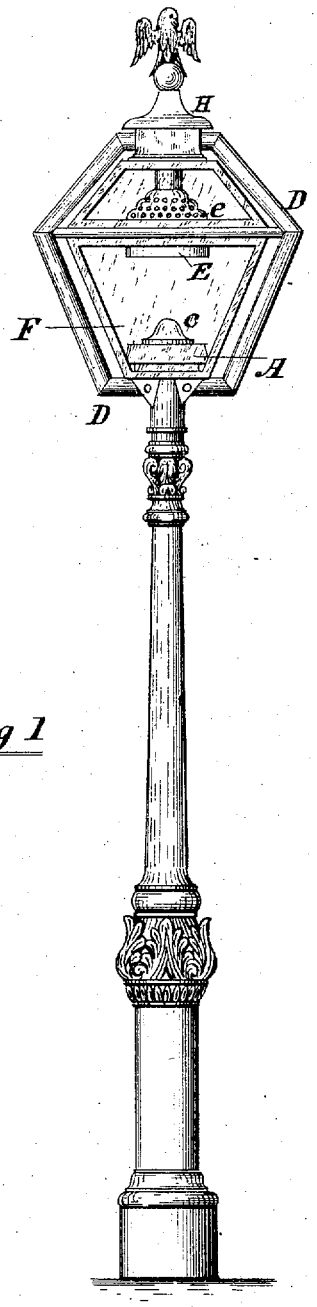
Figure 2:
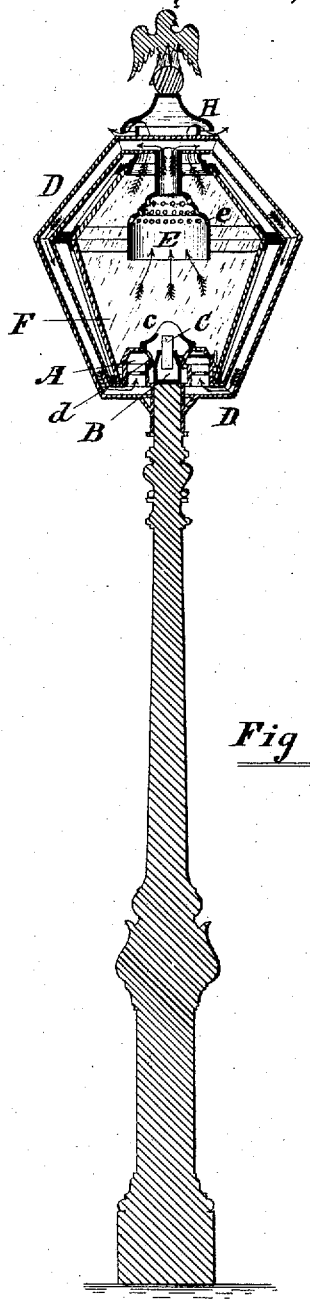
Figure 4:
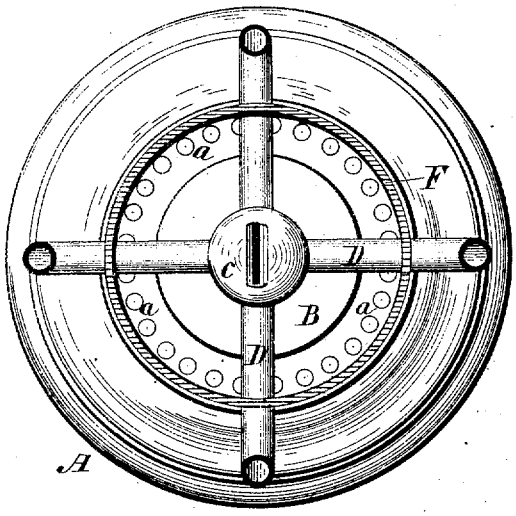
Figure 3:
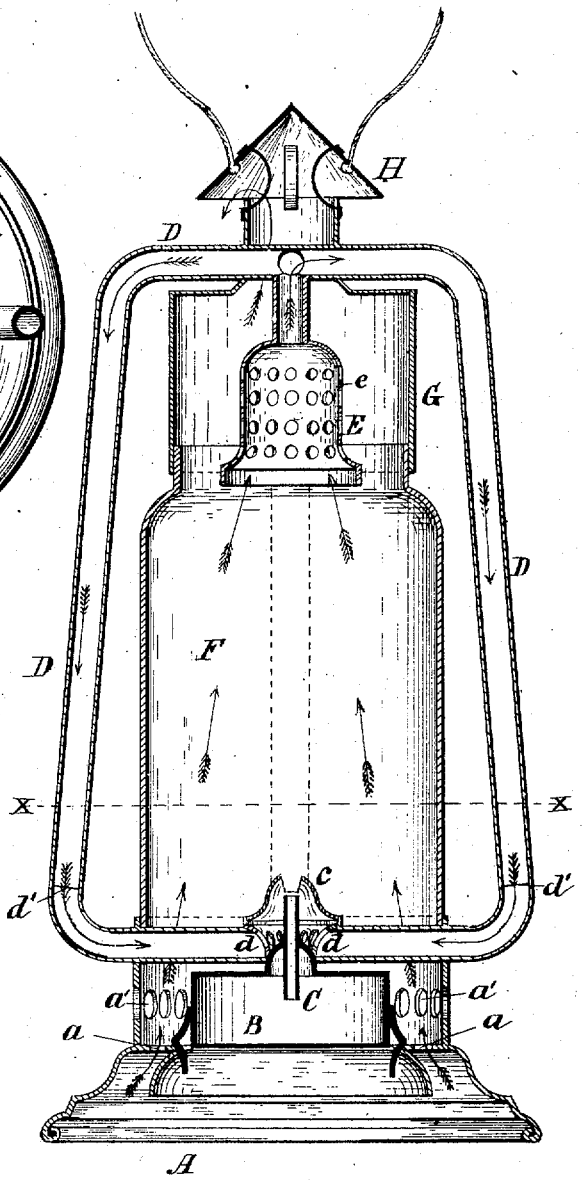

Figure 1 represents an elevation of my invention as applied to a stationary street-lamp; Fig. 2, a vertical central section of the same; Fig. 3, a vertical central section of a portable lantern embodying my invention, the feed-tubes being arranged to serve the purpose of a guard to the lantern; Fig. 4, a sectional plan view of the same, taken on the line *x x*, Fig. 3; and Fig. 5, a vertical central section of a square portable lantern also embodying my invention.

My invention relates to portable lanterns of all kinds; also, street-lamps and all lamps and lanterns designed for outdoor use, and which are therefore exposed to winds or currents of air moving from different directions and with different velocities, the object of the invention being the preservation of a constant supply-current of air to the burner, so that the flame will not be extinguished when exposed to high winds.

The invention consists in the combination of the lamp-burner with a globe or protector and one or more tubes or their equivalent, arranged with their upper ends opening above and over the burner or flame, and their lower ends opening underneath said burner or flame, whereby a constant current of air is induced down through the tubes to the burner to support combustion.

It also consists in one or more conduits for supplying fresh air to and through the burner to support combustion, in combination with a globe or protector having inlet-openings for the admission of fresh air outside of the burner at the bottom, and outlet-openings at the top thereof.

It also consists in a fresh-air conduit or conduits arranged to produce a balancing effect upon the air-columns when the lantern is oscillated, in combination with a globe or protector provided with air-openings at both top and bottom, arranged so that when the lantern is oscillated the products of combustion may escape at the bottom of the globe outside of the burner, and fresh air enter at the top thereof, thereby obviating the effects of centrifugal action and preventing the extinguishment of the flame.

It also consists in special features of construction and combinations of devices, all of which will be hereinafter described, and more definitely pointed out in the claims.

In the drawings, A represents the base or bottom of the lamp or lantern, and B the oil-cup or reservoir, which is supplied with a wick-burner, C, adapted to the use of carbon oils, being provided in this instance with a well-known slotted cone or protector, *c*. Just underneath the burner are the lower ends of air-tubes D, which have openings *d* into the burner below the top of the wick-tube or root of the flame. The said air-tubes extend outward and then upward, as shown in the drawings, and at their upper ends are bent inward and connected to a bell or inverted-funnel-shaped inclosure, E. This bell E is arranged over the burner in a manner similar to that described in Letters Patent No. 65,230, granted to me May 28, 1867, for an improvement in lamps, and a current of fresh air is induced through the feed-tubes D to the burner to support combustion in the same manner as described in the aforesaid patent.

The air-tubes D may be made in section at some convenient point, as shown at *d'*, so as to permit the detachment of the burner or lower portion of the lamp or lantern, or the removal of the lamp or lantern top when desired.

The bell E may be provided with perforations *e*, if desired, for the purpose of allowing the nitrogen or impure air which may be caught by the bell to pass out and escape from the top of the lantern, as indicated by the arrows, at openings constructed in said top for this purpose.

The lamp described in my prior patent mentioned above is adapted to indoor use only, or in positions not exposed to air-currents. When the lamp is exposed to winds or currents of air, it is necessary that the rising column of heated gases above the burner should be protected, and at the same time that there should be provision for an ample supply of fresh air to enter the feed-tubes. For this purpose a glass protector or globe, F, is provided, which surmounts the burner, and in some instances, as in the case of a street-lamp, partially incloses the lamp proper and its burner. This protector may be of any of the known forms, and adapted to the special use to which the lamp is to be applied, whether as a stationary street-lamp or a portable lantern.

The lamp or lantern is constructed with suitable openings at or within the base, to admit a supply of fresh air from without to enter within the protector or globe at the bottom thereof. There must also be provision for the escape of the products of combustion and superfluous air at the top of the globe or protector through suitable openings in the top of the lamp or lantern.

In Fig. 3 of the drawings, apertures *a* are made in the bottom of the base of the lantern, and also apertures *a'* in the side or exterior wall thereof, by means of which an ample supply of fresh air is admitted to the interior of the protector at the lower end thereof, these apertures being of such size and number as is necessary for the purpose. In the lantern illustrated by this figure the protector is surmounted by a large metallic tube, G, open at the top, and, in turn, surmounted by a cap, H, underneath which the products of combustion escape into the open air, as indicated by the arrows.

Figure 5:
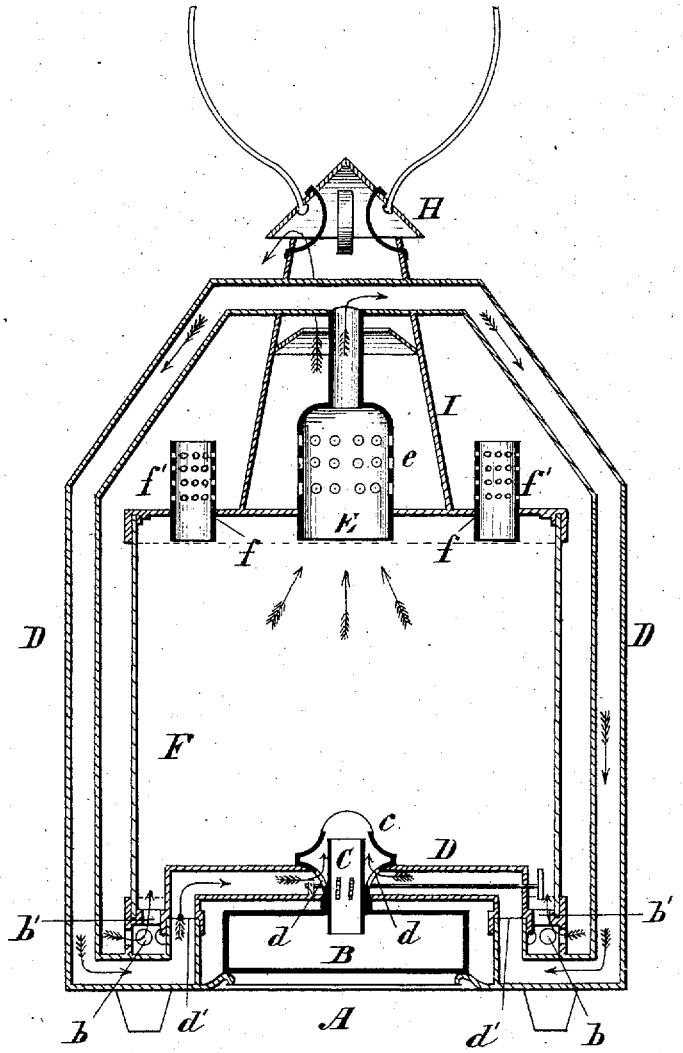

In Fig. 5 of the drawings, the fresh air is admitted through openings *b* at the side of the base, just below the gallery on which the protector rests, and in this gallery are apertures *b'*, through which the air passes up into the protector. The upper end of the protector in this figure is closed by a cap or cover, which, however, is provided with apertures *f* of suitable size and number to provide for the escape of the products of combustion and superfluous air. These apertures are located near the outer edge of the cap, and are shown provided with short tubes *f'*, inserted therein and projecting somewhat above the cap, their upper ends being perforated at the sides, if desired.

A protector, I, above the protector F in the lantern shown in Fig. 5, surrounds the bell, the protector being open at the top and surmounted by a cap, H, as in Fig. 3, to permit the gases to escape which may pass out from the perforations in the bell.

The heated draft induces the flow of fresh air from without into the protector at the bottom thereof, as indicated by the arrows, and from this supply a sufficient quantity is induced to enter the feed-tubes D, and becomes cool outside of the lantern, and thus of its own gravity, and also by force of the heated current behind, passes to the burner in a constant supply to support combustion. At the same time the products of combustion escape at the top of the protector, as above described.

The globe or protector prevents the disturbance of the rising column of heated gases above the burner by winds or air-currents, so that the circuit through the protector is always maintained, and the supply of fresh air through the feed-tubes and thence to the burner is constantly kept up, even though the lamp or lantern may be exposed to strong air-currents.

The fresh air admitted to the interior of the globe or protector, as described, also serves to prevent overheating. When the lantern is swung or oscillated, a peculiar operation takes place, owing to the openings at both the bottom and top of the globe or protector. Under the influence of centrifugal action the products of combustion will be drawn toward the bottom of the protector, and the openings at the bottom, outside of the burner, permit the heated gases thus drawn down to escape. At the same time fresh air will enter through the openings at the top of the protector to keep up the supply to the feed-tubes, and the flow of air through said tubes will be induced by centrifugal action operating to draw the air from the lower ends of the tubes, first on one side and then on the other.

The smothering of the flames by the products of combustion when the lantern is oscillated is thus prevented, and at the same time the supply of fresh air through the feed-tubes is maintained, so that the extinguishment of the flame is rendered almost impossible. A similar effect is produced when the lantern is suddenly raised, while when suddenly lowered the supply of air at the bottom of the protector is increased, and is accompanied by a corresponding acceleration in the current of air entering the feed-tubes, thereby preventing a reversal of the current in said tubes.

In stationary lamps or lanterns, or those which are not required to be moved from place to place, a simple feed-tube may be sufficient; but when the lamp or lantern is intended to be carried from place to place, or swung or oscillated in the hand, two or more tubes should be employed, arranged in pairs opposite each other, or otherwise. A balancing effect is thus obtained in the air-bodies contained in tubes on opposite sides of the lantern when the latter is swung or oscillated, which also is important in preventing the extinguishment of the flame.

When the lantern or lamp is of a size to permit the pipes or tubes D to return within the protector without being heated by the flame so as to counteract the effect sought, the entire tubes or their equivalent may be arranged inside the protector, if desired. In street-lamps the tubes may be arranged at each corner of the lamp, so as to form the frame-work thereof, with suitable provision for attaching the glass panes thereto and for hinging and securing a door upon one side, as desired.

I am aware that air has heretofore been conducted through tubes to an air-chamber below the burner, and thence through the latter, by the action of an ordinary chimney-draft, as in the patent of Crihfield, April 2, 1867, and also that bells and tubes have been used to catch the products of combustion and convey them back to the flame, as in the English patent of Braithwaite. These constructions, however, do not contain my invention; for in neither is there such a construction and arrangement of parts as to compel the main supply-current of air to support combustion to pass through the tubes and burner, and by means of the rising column of heated gases above the burner; and, furthermore, there is in neither the provision herein described for counteracting the usual deleterious effect on the flame when the lantern is oscillated.

Having thus described my invention, what I claim as new, and desire to secure by Letters Patent, is—

1. In combination with the burner of a lamp and a globe or protector thereof, one or more tubes or passages, D, or their equivalent, arranged to operate substantially as specified and described.

2. In a lamp or lantern, one or more tubes or conduits for supplying fresh air to and through the burner to support combustion, in combination with a globe or protector having air-openings at the bottom, outside and independent of the burner and its feed-conduits, and similar openings at the top thereof, substantially as described.

3. In a lamp or lantern, a fresh-air conduit or conduits to supply air to the burner, arranged to produce a balancing effect upon the air-columns when the lantern is oscillated, in combination with a globe or protector surmounting the burner, and provided with openings for the passage of air at both the top and bottom thereof, the bottom openings arranged outside and independently of the burner and its feed-conduits, whereby the products of combustion are permitted to escape at the bottom of the globe outside of the burner when the lantern is oscillated, and at the same time fresh air is permitted to enter at the top of the globe, substantially as described.

4. The base A of a lantern, in combination with air-feeding tubes D, made in section, as described, whereby the top of the lantern may be removed and the globe taken off, substantially as set forth.

JOHN H. IRWIN.

Witnesses:
CHAS. F. R. HEUCKERÓTH,
LEWIS F. BETTS.